(12) United States Patent
Shadduck

(10) Patent No.: US 11,641,928 B2
(45) Date of Patent: May 9, 2023

(54) COSMETIC BLENDER AND METHOD OF USE

(71) Applicant: John. H. Shadduck, Menlo Park, CA (US)

(72) Inventor: John. H. Shadduck, Menlo Park, CA (US)

(*) Notice: Subject to any disclaimer, the term of this patent is extended or adjusted under 35 U.S.C. 154(b) by 0 days.

(21) Appl. No.: 16/727,605

(22) Filed: Dec. 26, 2019

(65) Prior Publication Data

US 2020/0205552 A1 Jul. 2, 2020

Related U.S. Application Data

(60) Provisional application No. 62/786,067, filed on Dec. 28, 2018.

(51) Int. Cl.
| | |
|---|---|
| *A45D 34/04* | (2006.01) |
| *G09B 19/00* | (2006.01) |
| *A45D 40/28* | (2006.01) |
| *A45D 33/00* | (2006.01) |
| *A45D 33/18* | (2006.01) |
| *G05D 15/01* | (2006.01) |

(52) U.S. Cl.
CPC .............. *A45D 40/28* (2013.01); *A45D 33/00* (2013.01); *A45D 33/18* (2013.01); *A45D 34/04* (2013.01); *G09B 19/00* (2013.01); *A45D 2200/1036* (2013.01); *A45D 2200/155* (2013.01); *A45D 2200/207* (2013.01); *G05D 15/01* (2013.01)

(58) Field of Classification Search
CPC ........ A45D 40/00; A45D 40/26; A45D 40/28; A45D 33/00; A45D 33/18; A45D 34/00; A45D 34/04; A45D 34/042; A45D 37/00; A45D 2200/1009; A45D 2200/1036; A45D 2200/1063; A45D 2200/155; A45D 2200/207; A45D 2200/1018; B32B 5/18; B32B 27/065; B32B 2266/06; B32B 2266/104
USPC ................................................. 15/118, 244.4
See application file for complete search history.

(56) References Cited

U.S. PATENT DOCUMENTS

| | | | | | |
|---|---|---|---|---|---|
| 2,319,873 | A | * | 5/1943 | Linz .......................... | A47K 7/02 15/244.4 |
| 4,698,871 | A | * | 10/1987 | Patkos ................... | A45D 33/34 15/118 |
| 4,776,356 | A | * | 10/1988 | Jou ........................ | A45D 34/04 132/320 |

(Continued)

*Primary Examiner* — Cris L. Rodriguez
*Assistant Examiner* — Karim Asqiriba
(74) *Attorney, Agent, or Firm* — Levine Bagade Han LLP

(57) ABSTRACT

Cosmetic blenders and applicators, and more particularly to a soft, resilient blender system that includes an open-cell memory foam surface component that is easily cleanable or optionally disposable in combination with a core component that is fluid impermeable. Further, variations of the blender provide (i) patterned surface structures for makeup pickup and release together tamping features, (ii) user-controlled variable stiffness surface tamping features, (iii) actuated surface tamping features, (iv) accelerometer controlled surface tamping actuators, (v) wireless communication with smart phones and the like for controlling actuators, recording use and providing users with indications of optimal methods of use, (vi) sensors for sensing skin contacting parameters, and (vii) light and/or thermal emitters for enhancing blending and setting of cosmetic materials.

11 Claims, 18 Drawing Sheets

(56) References Cited

U.S. PATENT DOCUMENTS

| | | | | |
|---|---|---|---|---|
| 6,467,981 B1* | 10/2002 | Gueret | ............... | A45D 40/00 |
| | | | | 401/201 |
| 2006/0162735 A1* | 7/2006 | Thiebaut | ............... | A45D 34/04 |
| | | | | 132/200 |
| 2007/0209133 A1* | 9/2007 | Linzell | ............... | A45D 34/04 |
| | | | | 15/209.1 |
| 2012/0100195 A1* | 4/2012 | Sainz | ............... | A45D 37/00 |
| | | | | 424/401 |
| 2013/0125911 A1* | 5/2013 | Mammone | ............... | A45D 33/005 |
| | | | | 132/200 |
| 2013/0343797 A1* | 12/2013 | Samangooie | ....... | A61M 35/006 |
| | | | | 401/6 |
| 2014/0100589 A1* | 4/2014 | Gordon | ............... | A45D 34/04 |
| | | | | 606/131 |
| 2014/0369737 A1* | 12/2014 | Gundersen | ............ | A45D 37/00 |
| | | | | 401/132 |
| 2016/0128912 A1* | 5/2016 | McConaughy | ........ | A45D 40/26 |
| | | | | 510/140 |
| 2018/0325243 A1* | 11/2018 | Omoto | ............... | A45D 37/00 |
| 2018/0338600 A1* | 11/2018 | Dizes | ............... | B32B 27/20 |
| 2018/0360194 A1* | 12/2018 | Cho | ............... | A45D 34/00 |
| 2019/0038000 A1* | 2/2019 | Choi | ............... | A45D 34/04 |
| 2019/0059548 A1* | 2/2019 | Chaillet-Piquand | ... | A45D 33/34 |
| 2019/0069662 A1* | 3/2019 | Peters | ............... | B29C 44/04 |
| 2020/0170379 A1* | 6/2020 | Bickford | ............... | A45D 40/28 |

\* cited by examiner

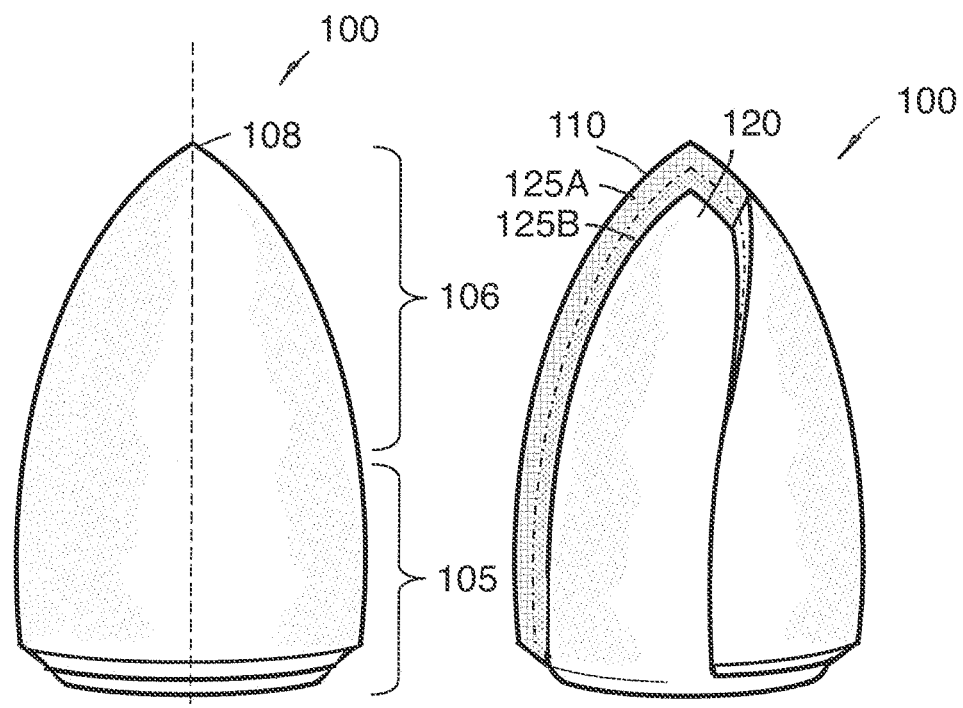
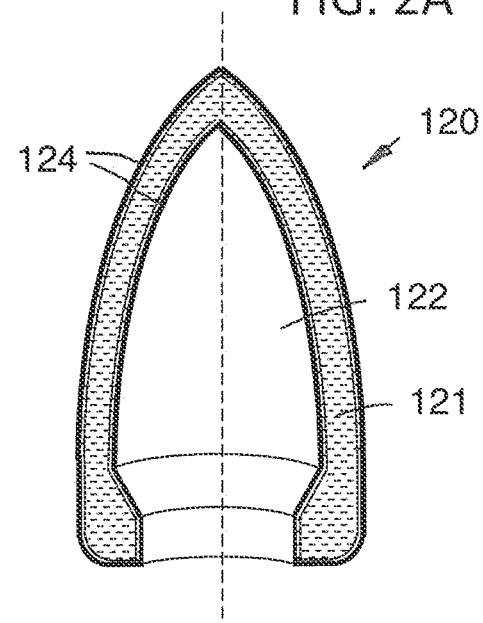

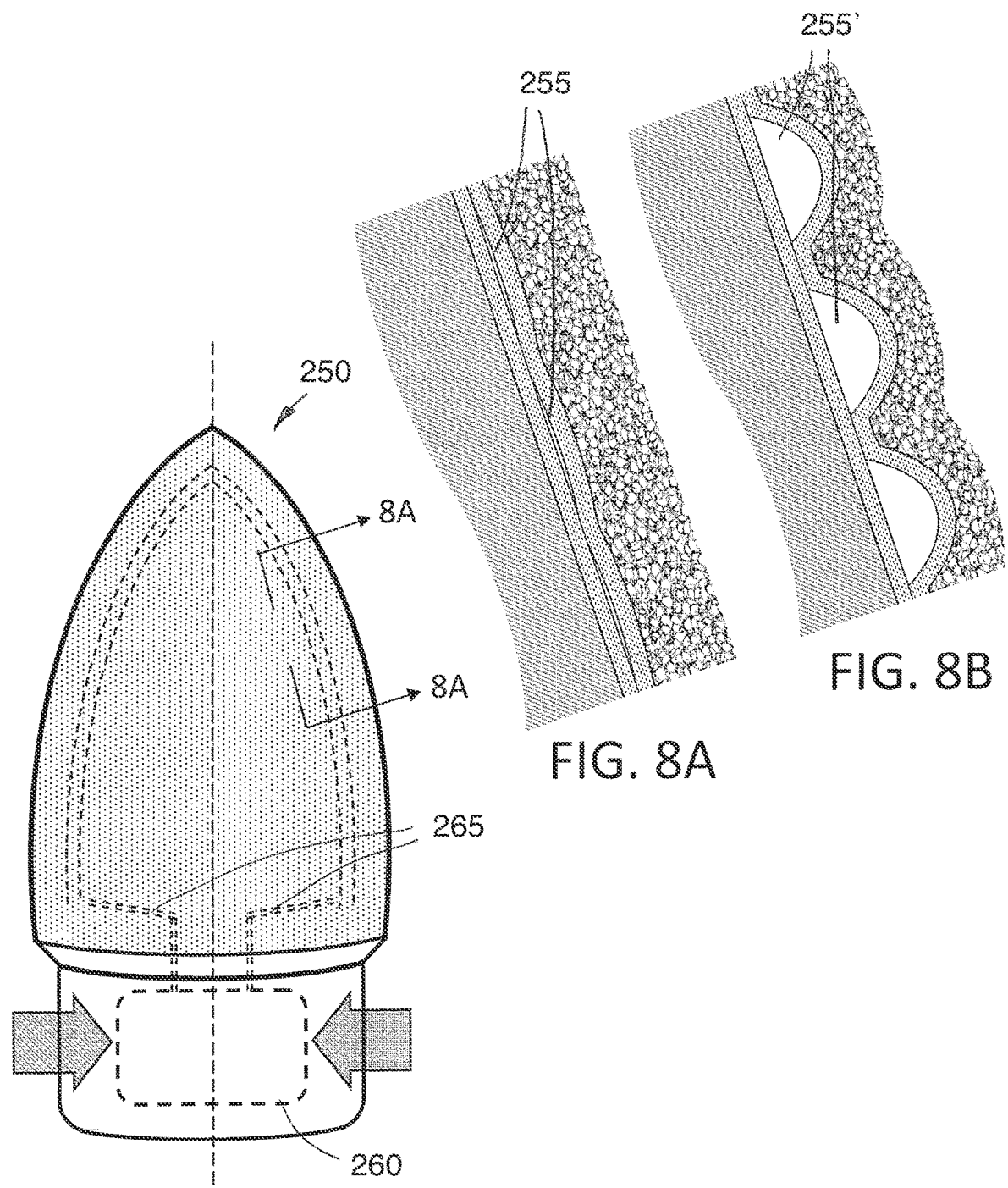

COSMETIC BLENDER AND METHOD OF USE

RELATED APPLICATION INFORMATION

This application is a non-provisional application of U.S. Provisional Application No. 62/786,067 filed on Dec. 28, 2018. The entirety of which is incorporated by reference.

BACKGROUND OF THE INVENTION

1. Field of the Invention

The present invention relates to cosmetic blenders and applicators, and more particularly to a soft, resilient blender system that includes an open-cell memory foam surface component that is easily cleanable or optionally disposable in combination with a core component that is fluid impermeable. Further, variations of the blender provide (i) patterned surface structures for makeup pickup and release together tamping features, (ii) user-controlled variable stiffness surface tamping features, (iii) actuated surface tamping features, (iv) accelerometer controlled surface tamping actuators, (v) wireless communication with smartphones and the like for controlling actuators, recording use and providing users with indications of optimal methods of use, (vi) sensors for sensing skin contacting parameters, and (vii) light and/or thermal emitters for enhancing blending and setting of cosmetic materials.

2. Description of the Background Art

Professional makeup artists often work in fast-paced environments where there is a need to apply makeup to several models or actors in rapid succession, particularly in the fashion, theatre, and television industries. Such makeup artists may spend a considerable amount of time cleaning and preparing their makeup tools when working with multiple clients over a short period of time. With the advent of new technologies in high-resolution digital cameras and video, there is an increasing need for professionally blended face and body makeup.

Cosmetic applicators known as makeup sponges or blenders are well known and are a mainstay of a makeup artist's toolkit. The commercially available makeup sponges or blenders typically consist of a latex or urethane foam sponge 50, as shown in FIG. 3, wherein the sponge consists of a uniform density open cell foam and may have a variety of shapes and sizes.

There are several disadvantages involving the use of the currently available sponges and blenders. In normal use, a sponge or blender is dabbed continuously against the recipient's skin where cosmetic materials, such as contour makeup 60 (FIG. 3), are picked up by open cells of the blender surface and then released back onto the skin surface as the blender is moved to thus blend the cosmetic material.

First, many blenders are impregnated with large amounts of cosmetic material during use, which can be wasteful and costly. If too much cosmetic material is impregnated in the applicator, it may be difficult to blend the cosmetic material uniformly. On the other hand, if the amount of cosmetic material retained by the applicator is too small, then blending may take longer and still may not be uniform. The designs of blenders have been adjusted to improve the amount of cosmetic material impregnated into the sponge surface during use, mainly by experimenting with the size and density of pores in the open cell foam that comprises the blender. Typically, the open cell foam blenders that are commercially available have very small pores which are adapted to hold water before use to moisturize the sponge. In use, the dabbing motion can cause the cosmetic material to migrate through the entire sponge. Thereafter, cleaning the sponge is problematic as the makeup material can migrate throughout the sponge. Further, the complete drying of such blender sponges can take hours due to the very small pore size in such blenders.

Further, from the viewpoint of hygiene, bacteria can easily grow inside the pores of the blender, especially when liquid cosmetic material is applied, because the material can permeate through the entire foam body of the applicator.

Another potential disadvantage of currently available open cell foam blenders relates to their use with anticipated new forms of makeup materials, some of which are being contemplated by the author and are termed herein as microbiome cosmetics. While not widely used today, it is anticipated that makeup materials such as primers, etc., will be used that carry living microorganisms, i.e., the microbiome. When using an open cell blender after the application of microbiome cosmetics, it will be inevitable that such living microorganisms will migrate throughout the sponge, which again may make thorough cleaning and drying more important. Further, it is possible that such applicators would require regulatory clearance for sterilization when used to apply microbiome materials to a recipient's face.

An additional disadvantage of current open cell foam blenders relates to the uniformity of the resilient open cell foam material and the slow rebound of such memory foam from a compressed or tensioned state to its repose memory shape. In use, a makeup artist also could find it useful to have different density foams with different force/compression characteristics for blending in a different area of a recipient's face, for example, softer foam for use around the eyes and less soft foam for use in other locations. Further, it would also be very useful to have faster rebounding foam which could speed up the blending of makeup.

What is needed is:
 a cosmetic applicator or blender configured for very rapid cleaning and drying after each use to provide for completely hygienic makeup applications;
 a cosmetic applicator or blender or sponge with uniform, microfabricated pores suited for picking up makeup without excessive impregnation of the makeup into the applicator to limit waste of cosmetic materials;
 a cosmetic applicator or blender adapted for use with microbiome cosmetics which carries limited volumes of such live cultures to conserve expensive products and that is easily cleanable or sterilizable;
 a cosmetic applicator or blender with a surface structure adapted to absorb a specific amount of water to allow for a consistent level of moisture in the applicator for specific types of makeup;
 a cosmetic applicator or blender for makeup artists that can be inexpensive and adapted for single use that has all needed features for controlled moisture content, feel on the skin, and adapted for limiting waste of cosmetic materials;
 a cosmetics applicator or blender that provides a makeup-carrying surface with a first portion configured to pick up makeup during blending and a second portion for tamping cosmetic material into foundation cosmetics and skin;

a cosmetic applicator with at least one actuator for altering the force/deformation characteristics of the blender for differential blending/dabbing with a single applicator;

a cosmetic applicator or blender with ultrasound actuators, linear resonant actuators (LRAs), eccentric rotating mass actuators (ERMs) or the like for enhanced tamping of cosmetic material with high frequency movement or vibration;

a cosmetic applicator or blender with powered actuators and a communication link to a smart phone, tablet, or computer to adjust operating parameters;

a cosmetic applicator or blender with sensors, such as a pressure sensor, accelerometer, etc., and an optional communication link to a remote device and/or the cloud to store user data and/or receive operating instructions or suggestions; and a cosmetic blender carrying a processor or control system configured to activate actuators only when contacting skin as the user dabs the blender.

The several variations of the present invention described below provide a cosmetics applicator or blender that solves the aforementioned problems.

SUMMARY OF THE INVENTION

The features described herein, various novel details of construction and combinations of parts, and other advantages, will be described with reference to the accompanying drawings and claims. It is understood that the particular methods and devices conveying the inventive features are shown by way of illustration and not as a limitation of the invention. The principles and features of this invention may be employed in various and numerous embodiments without departing from the scope of the invention.

The present disclosure includes improved cosmetic applicators. For example, such an applicator can include a resilient body shaped for gripping with fingers of a user; a surface of the resilient body comprising a first resilient portion and a second resilient portion that forms a pattern in the first resilient portion, wherein the first resilient portion has a first functional parameter and the second resilient portion has a second functional parameter.

In one variation of the cosmetic applicator, the first functional parameter and the second functional parameter are selected from a group of material density, open cell characteristics, closed cell characteristics, material density, elastic modulus, hydrophobic characteristics, hydrophilic characteristics, oleophobic characteristics, oleophilic characteristics, elastic rebound characteristics, material thickness, and color coding.

The pattern can be selected from a group of adjacent lines, dots, squares, polygonal shapes, and free-form shapes. In an additional variation, the surface of the resilient body in a repose state is smooth. Alternatively, or in combination, the surface of the resilient body in a repose state is textured.

In an additional variation, an outer surface of the first resilient portion is raised above an outer surface of the second resilient portion.

The cosmetic applicator can be configured such that a surface portion is removable from a core portion of the resilient body. In variations of the device, a surface portion comprises a first layer and a second layer having different porous characteristics.

In an additional variation, the core portion has a fluid impermeable surface.

Another variation of a cosmetic applicator can include a resilient body shaped for gripping with fingers of a user; a surface portion of the resilient body comprising a first elastomeric portion and a second elastomeric portion arranged in a pattern within the first elastomeric portion, wherein the first elastomeric portion has an outer surface that is raised above an outer surface of the second elastomeric portion.

In one variation, the surface portion includes a foam layer that overlies a patterned inner surface, wherein said foam layer is detachable from the resilient body. The foam layer can be a uniform material. Alternatively, foam layer can comprise first and second foam materials with different porosities.

Another variation of a cosmetic applicator includes a body shaped for gripping with the fingers of a user; a surface portion of the body having at least one resilient characteristic; and a bladder in an interior of the body and an actuator carried in the body for adjusting a fluid pressure in the bladder to alter the at least one resilient characteristic of the surface portion.

The cosmetic applicator can include an actuator that is a manually compressible secondary bladder.

Another variation of a cosmetic applicator includes a body shaped for gripping with the fingers of a user; a surface portion of the body comprising a resilient material; and an actuator carried in the body for actuating a surface portion of the body.

The actuator can be at least one of a fluidic actuator, a piezoelectric actuator, and a mechanical actuator. The cosmetic applicator can further include a control system for controlling operating parameters of the actuator. For example, the control system can be configured to send and receive a control signal from a remote device. In addition, the control signal can be transmitted wirelessly to and from the remote device. Variations include the remote device, a smart phone, tablet, a smart watch and/or other networked personal electronic devices. The remote device can also comprise a computer and display.

In additional variations, the actuator is configured to apply forces generally outward from the surface portion of the body. The actuator can be configured to apply forces generally parallel to the surface portion of the body. In additional variations, the cosmetic applicator includes a plurality of actuators configured to apply forces generally parallel to the surface portion in different vectors.

Another variation of a cosmetic applicator includes a body shaped for gripping with the fingers of a user; a surface portion of the body comprising a resilient material; and an accelerometer carried in the body for sensing movements of the body and providing signals of said movements.

The cosmetic applicators described herein can further include a battery carried by the body coupled to the accelerometer. In an additional variation, the cosmetic applicator further includes a control system configured to receive said signals to thereby control an actuator carried by the body. The control system can be configured to receive said signals to thereby control an indicator mechanism carried by the body. In variations, the indicator provides at least one of an aural signal, a visual signal and a tactile signal.

Yet another variation of a cosmetic applicator includes a body shaped for gripping with the fingers of a user; a surface portion of the body comprising a resilient material; and at least one actuator carried by the body causing high frequency movement of a surface portion of the body. The cosmetic applicator can include a body that comprises a core component carrying the actuator and a detachable surface component comprising at least in part a porous material.

The present disclosure also includes methods for/related to blending cosmetic materials on a user's skin. For example, one such method includes providing a resilient body having a surface formed by a first resilient portion and a second resilient portions forming a pattern in the first resilient portion, wherein the first resilient portion is porous and is more easily compressible that the second resilient portion; dabbing the surface portion against cosmetics on the user's skin to blend such cosmetics, wherein such dabbing is adapted to cause the first resilient portion to collect and redeposit a cosmetic material and to cause the second resilient portion to tamp the cosmetic material into cosmetics and the recipient's skin.

The method also includes providing instructions to a user to instruct the user to carry out dabbing of the surface portion against cosmetics on the user's skin.

BRIEF DESCRIPTION OF THE DRAWINGS

In order to better understand the invention and to see how it may be carried out in practice, some preferred embodiments are next described, by way of non-limiting examples only, with reference to the accompanying drawings, in which like reference characters denote corresponding features consistently throughout similar embodiments in the attached drawings.

FIG. 1 is a perspective view of a cosmetic applicator or blender corresponding to the invention.

FIG. 2A is a perspective cut-away view of the blender of FIG. 1, showing an open cell surface component is removable from the fluid impermeable core component.

FIG. 2B is a sectional view of the resilient core component of the blender of FIGS. 1 and 2A and shows an open interior space in the core component.

FIG. 7 is a schematic view of another blender variation that includes a fluidic actuator for providing or adjusting the tamping features in the blender surface.

FIG. 8A is a greatly enlarged sectional view of the surface of the blender of FIG. 7 showing the tamping features in a non-expanded form.

FIG. 8B is a sectional view of the tamping features of the blender surface of FIG. 8A in an expanded form.

DESCRIPTION OF THE INVENTION

Figure 3:
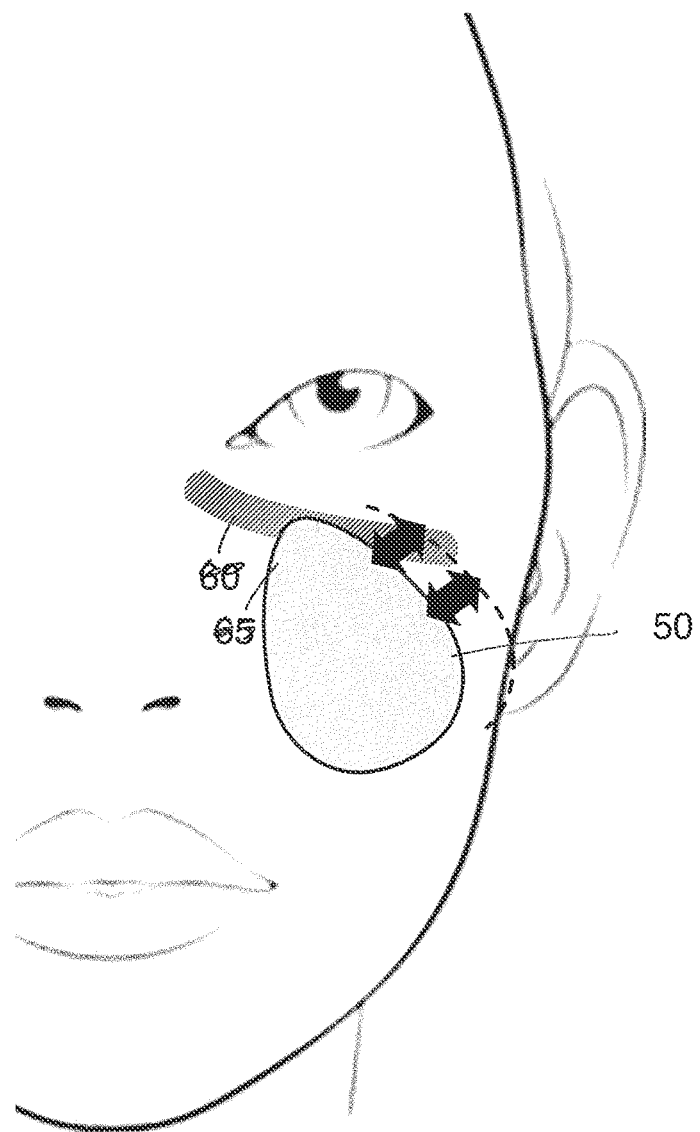
FIG. 3 is a schematic view of a method of using a prior art sponge blender in dabbing cosmetic materials on a recipient's skin.

FIG. 1 shows a cosmetics applicator, tool or blender 100 corresponding to the invention which is adapted for gripping with a user's fingers and then typically used in a dabbing or stippling motion to blend and apply cosmetic materials to a recipient's face (cf. FIG. 3). The shape and contours of the blender can vary and in one embodiment shown in FIG. 1, the applicator has a proximal portion 105 that is generally gripped with the user's fingers and a distal portion 106 that tapers to a rounded or sharp apex 108. The blender or applicator of FIG. 1 comprises a soft, compressible, resilient body as can be easily understood. While the blender of FIG. 1 is rounded and tapers to distal apex 108, various flat, polygonal and planar variations are possible. The length dimension of the applicator 100 may range from about 20 mm to 60 mm but any dimensions are possible for different makeup blending purposes. Other shapes are described in additional embodiments below.

In FIG. 2A, it can be seen that the cosmetics applicator or blender 100 of FIG. 1 has a surface component or portion 110 that comprises a soft, resilient open cell structure and typically is an open cell foam or sponge, often called a memory form. In other variations, at least a portion of the surface component 110 can comprise other open cell structures such as a microfabricated polymer or a layer electrospun fibers, as will be described below. The surface component 110 interfaces with the core component or portion 120 of the blender 100, which also is soft and resilient. As can be seen in FIG. 2B, the core component 120 in one variation is an open cell foam 121 with open interior space 122. In this variation, the surfaces of the core component 120 comprise a fluid impermeable layer 124 (FIG. 2B). In other variations described below, the core component 120 can comprise a body or structure that is a foam block without the interior open space and is configured with the same compressibility and resilient characteristics with the fluid impermeable surface layer.

Now referring to FIG. 2A, in one variation, the open cell surface component 110 comprises a first outer layer 125A and the second inner layer 125B, which have different dimensions of the open cell structure and may also differ in material characteristics such as hydrophobicity. The first outer layer 125A is configured with open cells that have a selected dimension adapted to receive, carry and blend makeup materials therein as the blender surface is used in a dabbing fashion against the user's skin, as shown in FIG. 3. In one variation, the first outer layer 125A can have a thickness of 0.2 mm to 5.0 mm a more often from 0.5 mm to 2.5 mm. The mean dimension of open cells in the outer layer 125A can range between 100 µm and 500 µm.

Still referring to FIG. 2A, this variation of blender 100 has a second inner layer 125B of the surface component 110 that comprises an open cell structure adapted to carry water in a selected volume to provide moisture for applying or blending makeup material carried transiently by the first outer layer 125A when dabbed the recipient's skin as described above. In one variation, the second inner layer 125B can have a thickness of 0.5 mm to 10.0 mm and more often from 2.0 mm to 5.0 mm. The mean dimension of an open cell in the second inner layer can range between 5 µm and 250 µm. In the embodiment illustrated in FIG. 2A, the mean dimension of the open cells in the second inner layer 125B are significantly smaller than the mean dimension of the open cells in the first outer layer 125A, as the inner layer is configured to allow for the free flow water through both the first and second layers 125A, 125B. However, the smaller open cells of inner layer 125B are adapted to reduce or prevent the migration of makeup materials (powder or fluid) through the first outer layer 125A and into the second inner layer 125B. In some variations, the second inner layer 125B is designed with very small open cell dimensions that can receive water but entirely prevent the movement of makeup material into such open cells. As described above, the outer surface layer 124 of the core component 120 is fluid impermeable so that any fluid absorption and makeup migration is prevented following material and fluid impregnation of the surface component 110.

Further, still referring to FIG. 2A, the material of the second inner layer 125B can be a hydrophobic material that will accept the migration of water therein but has the tendency the repel retained water which then assists in moving water droplets outward through the surface component 110, for example, when the blender is squeezed. Silicone is an example of a hydrophobic material that can be used in the second inner layer 125B. In contrast, in one variation, the first outer layer 125A can be a substantially hydrophilic foam material that does not resist carrying small amounts of water or makeup fluids therein.

Thus, it can be understood from FIGS. 1 and 2A, the open cell surface component 110 comprises only a small fraction of the entire cubic volume of the applicator 100 when in its repose or non-compressed shape, as shown in FIGS. 1 and 2A. In one aspect of the invention, the open cell component 110 is less than 40% of the total spatial volume of the applicator or blender 100. More often, the total volume of the open cell component is less than 30% of the total spatial blender volume or less than 20% of the total spatial volume. In the embodiment shown in FIG. 1, the open cell component is less than 10% of the total spatial blender volume. The term spatial volume, as used herein, means the total volume of the spatial "envelope" defined by the blender without regard to the open interior space. The term total volume of the open cell component means the actual physical volume of such a component and not the volume of the envelope defined by the component.

Stated another way, in another aspect of the invention, it has been found that the retained water volume carried by the open cell structure (surface component) can be less than 20 mL or less than 10 mL and still provide adequate moisture for dabbing or blending of makeup. In contrast, prior art makeup sponges or blenders typically retain far greater volumes of water since the entire applicator is an open cell foam. Such applicators that retain significantly larger water volumes are undesirable since cleaning and drying such sponge-type applicators is time-consuming, and may result in mold and bacteria growth in the sponge material if not properly cleaned and dried.

As can be understood from FIGS. 2A and 2B, after use, the outer blender component 110 can be removed from the core component 120. In one aspect of the invention, the makeup artist can simply dispose of the outer component 110 as it can be expensive. In another aspect of the invention, the makeup artist can clean, rinse and dry the outer component 110 which can be accomplished very quickly since there is a limited volume of open cell material that can carry water and makeup materials. The outer component 110 can be washed under a faucet and then also can be dried rapidly after squeezing out any water since the outer component has a very limited volume of open cells and air can be exposed on all sides of the component 110.

Figure 5A:
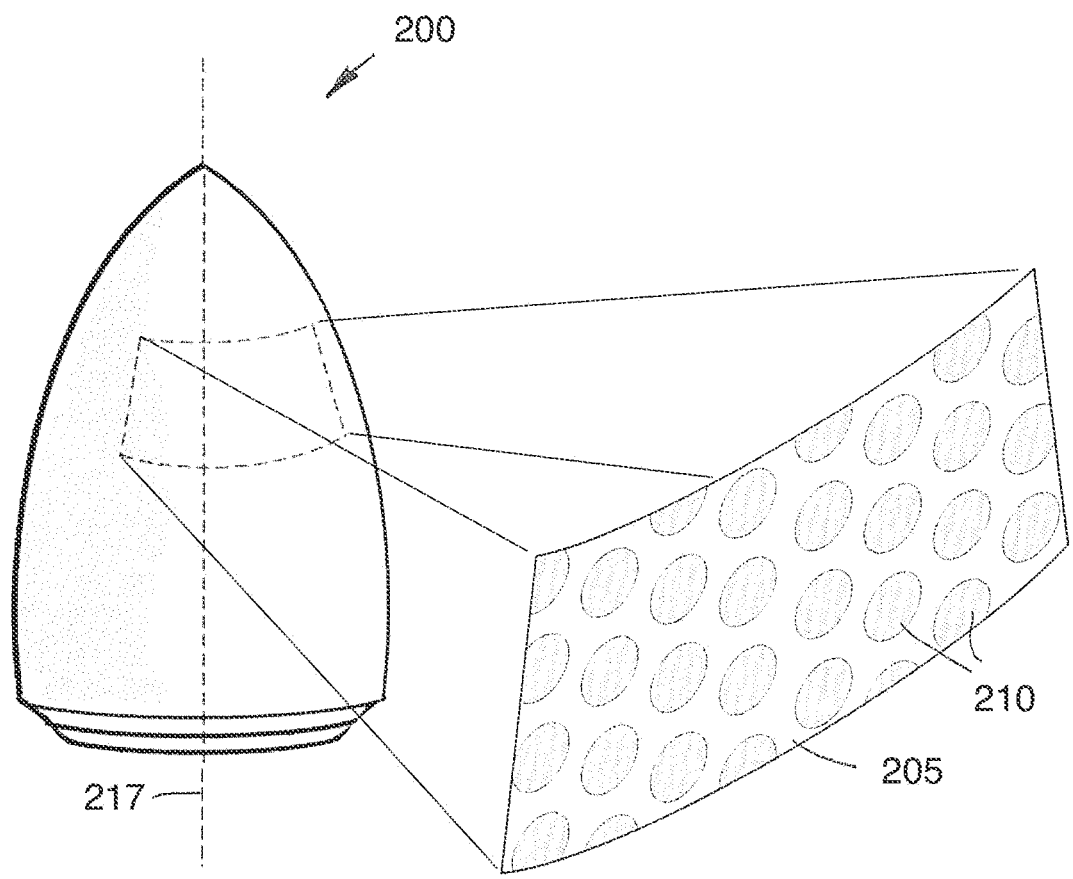
FIG. 5A is a schematic view of a variation of a blender similar to that of FIGS. 1-2B with a patterned surface having first porous surface features adapted to controllably pick up cosmetic material during dabbing and second less porous surface features adapted to tamp cosmetic materials during dabbing.

Now turning to FIG. 5A, another variation of a blender 200 is shown that is similar to that of FIGS. 1-2B except that includes a patterned surface having first porous surface features 205 adapted to controllably pick up cosmetic material during dabbing and second less porous surface features 210 adapted to tamp cosmetic materials during dabbing. This variation differs significantly from the prior art blender of FIG. 3, which simply has a porous sponge surface 65 which absorbs too much cosmetic material in the tamping stroke when dabbing simply because the cosmetic material further impregnates the sponge surface rather than primarily tamping the cosmetic materials.

Figure 4A:
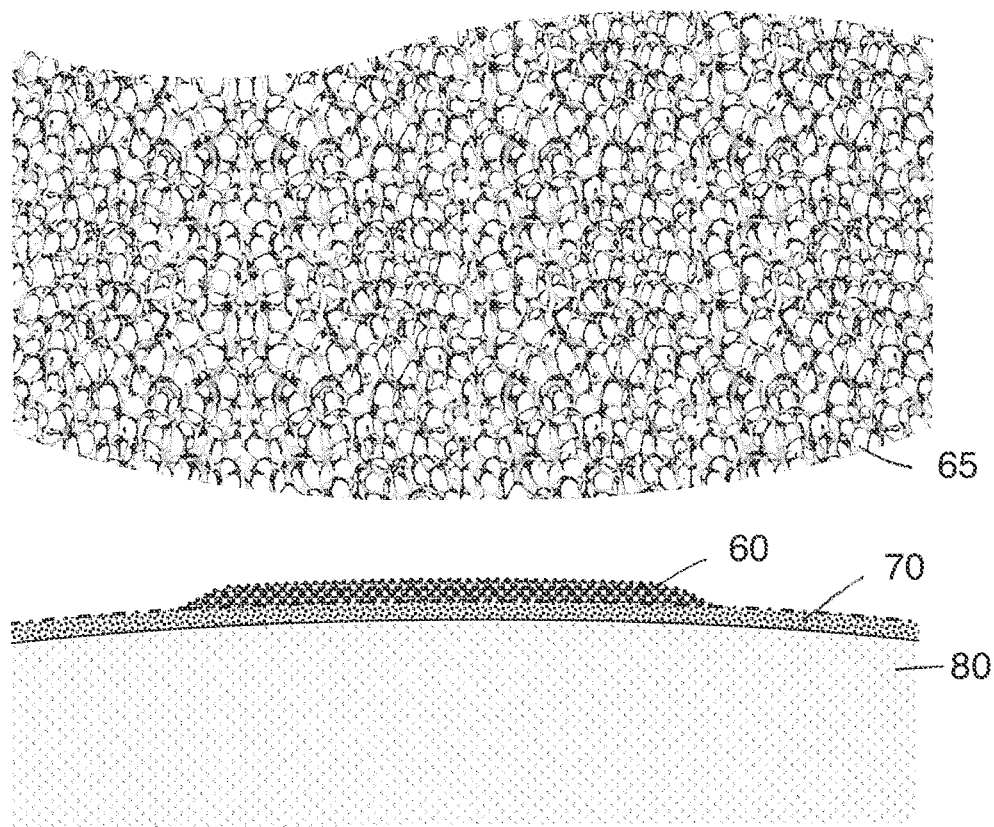
FIGS. 4A-4F are sectional views of a very small surface portion of the prior art blender of FIG. 3 during use showing the first and second dabs to illustrate the effect of tamping and lifting the blender.
Figure 4B:
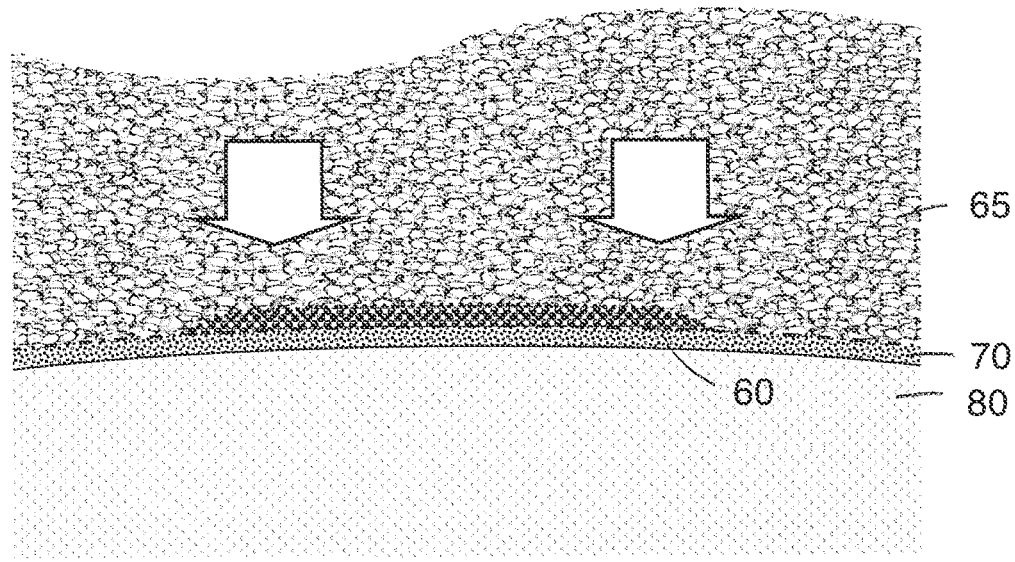
Figure 4C:
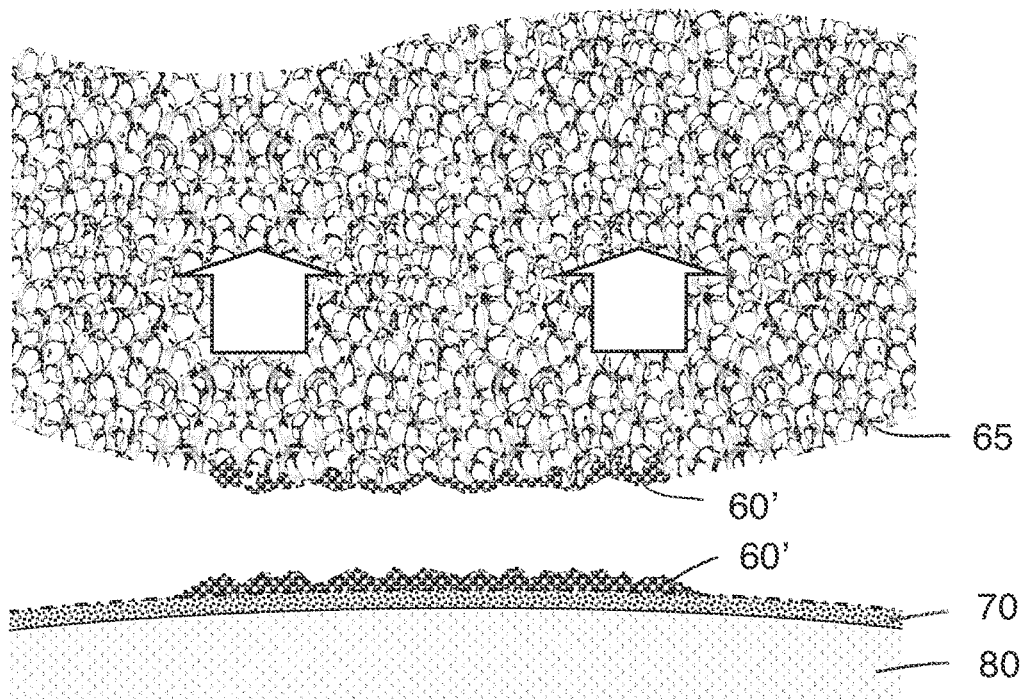
Figure 4D:
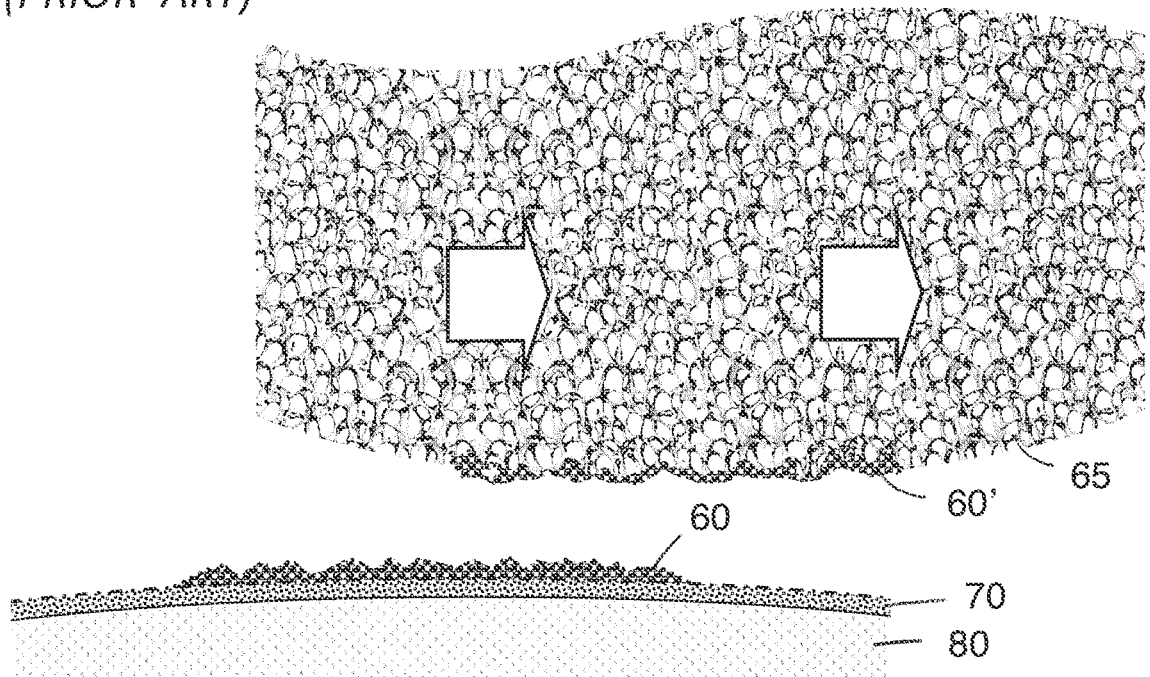
Figure 4E:
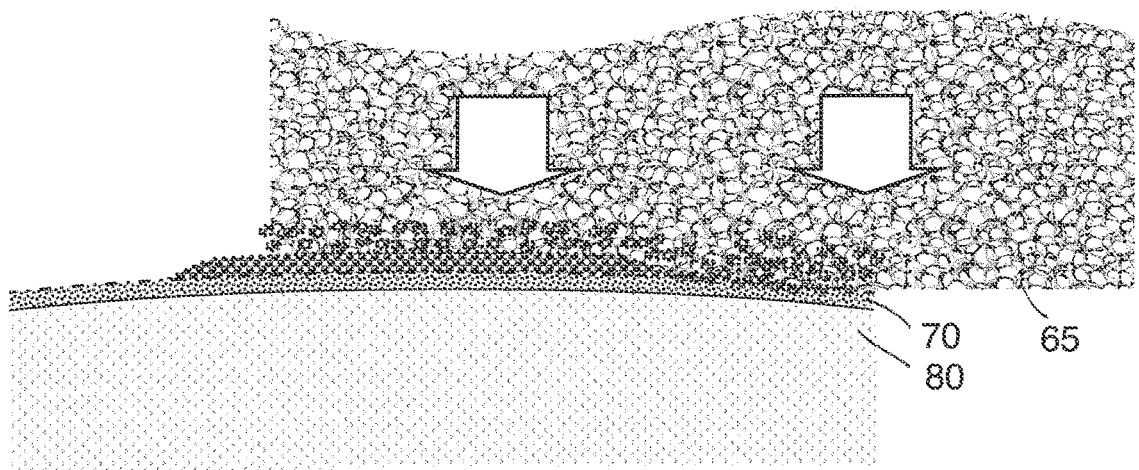
Figure 4F:
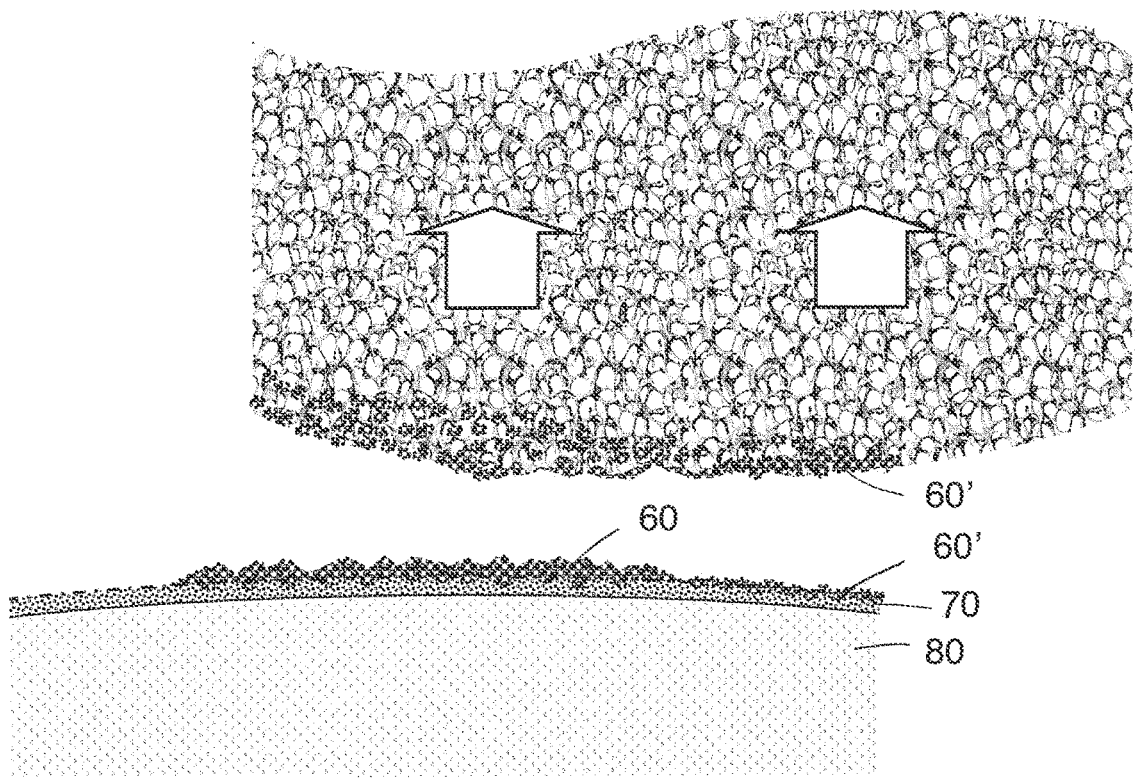

FIGS. 4A-4F help illustrate the sequence of steps in dabbing of the prior art sponge or blender of FIG. 3 wherein FIG. 4A shows the blender surface 65 above contouring makeup material 60 which was applied over a foundation layer 70 and the recipient's skin 80. FIG. 4B shows the blender surface 65 in the tamping stroke contacting the contour material 60. FIG. 4C illustrates the blender surface 65 after the lifting stroke with contour material 60' picked up and carried by the surface 65. FIGS. 4D-4E then illustrate the blender surface 65 being moved laterally and then the tamping stroke against the patient's foundation layer 70 and skin. FIG. 4F illustrates the lifting stroke again wherein the blender surface 65 has redeposited some picked-up contour material 60' laterally from the original contouring 60 to thereby blend the contouring makeup. However, the tamping stroke of FIG. 4E causes the cosmetic material to be impregnated into the sponge blender 65 and can limit the effectiveness of tamping the picked-up contour material 60' into the foundation 70.

Figure 6A:
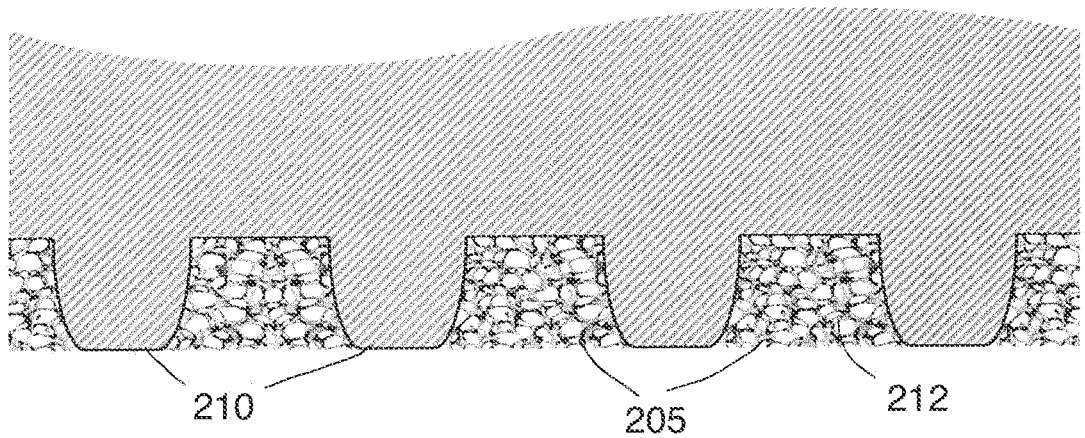
FIGS. 6A-6E are greatly enlarged sectional views of a surface portion of a blender of FIGS. 5A-5B showing the porous features for cosmetic material pick up and other features for tamping cosmetic material.

Now referring again to the blender 200 of FIG. 5A corresponding to the invention, it can be understood that a first surface portion 205 of the blender is configured to carry moisture and pick up cosmetic material in a controlled manner while the second surface portion 210 has lesser porosity or no porosity and is adapted for tamping cosmetic material into a foundation layer 70. FIG. 6A shows an exemplary cross-section of a small portion of the surface of the blender 200 of FIG. 5A, wherein porous open cell foam 212 is adapted for capturing moisture content and picking up cosmetic material. FIG. 6A further shows the second surface features 210 adapted for tamping such cosmetic materials.

Figure 5B:
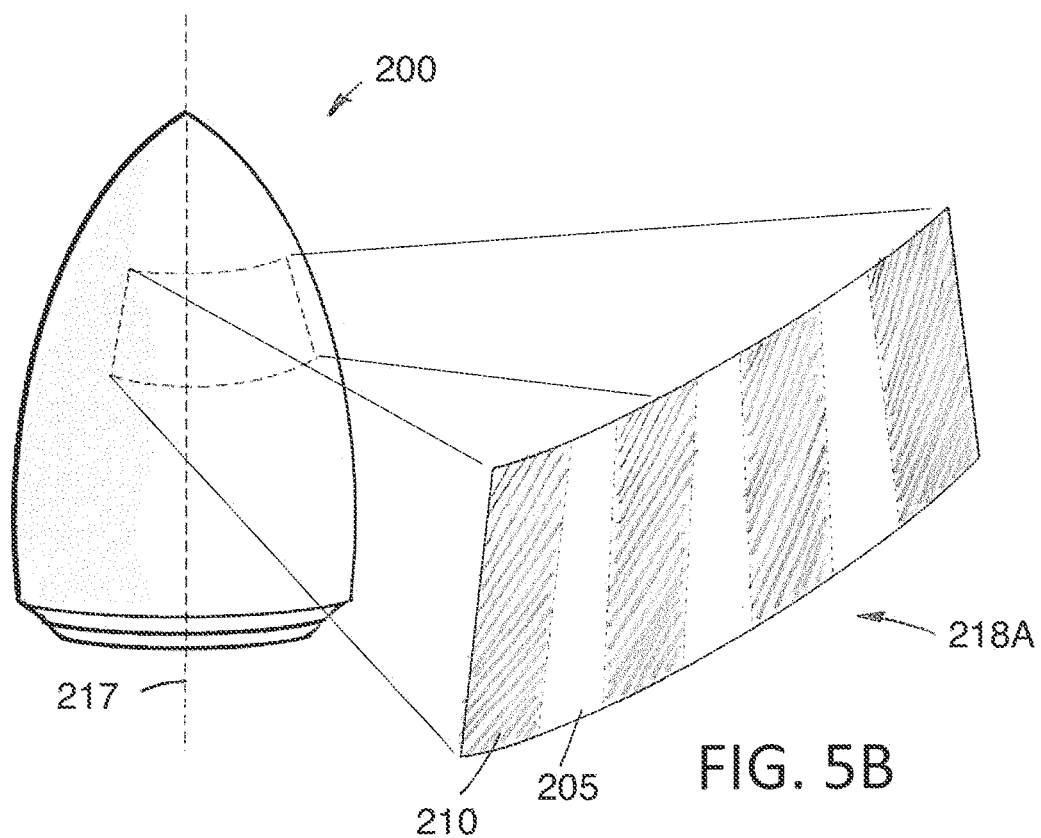
FIG. 5B is a schematic view of another blender similar to that of FIG. 5A with a different pattern of features for cosmetic material pick up and tamping.
Figure 5C:
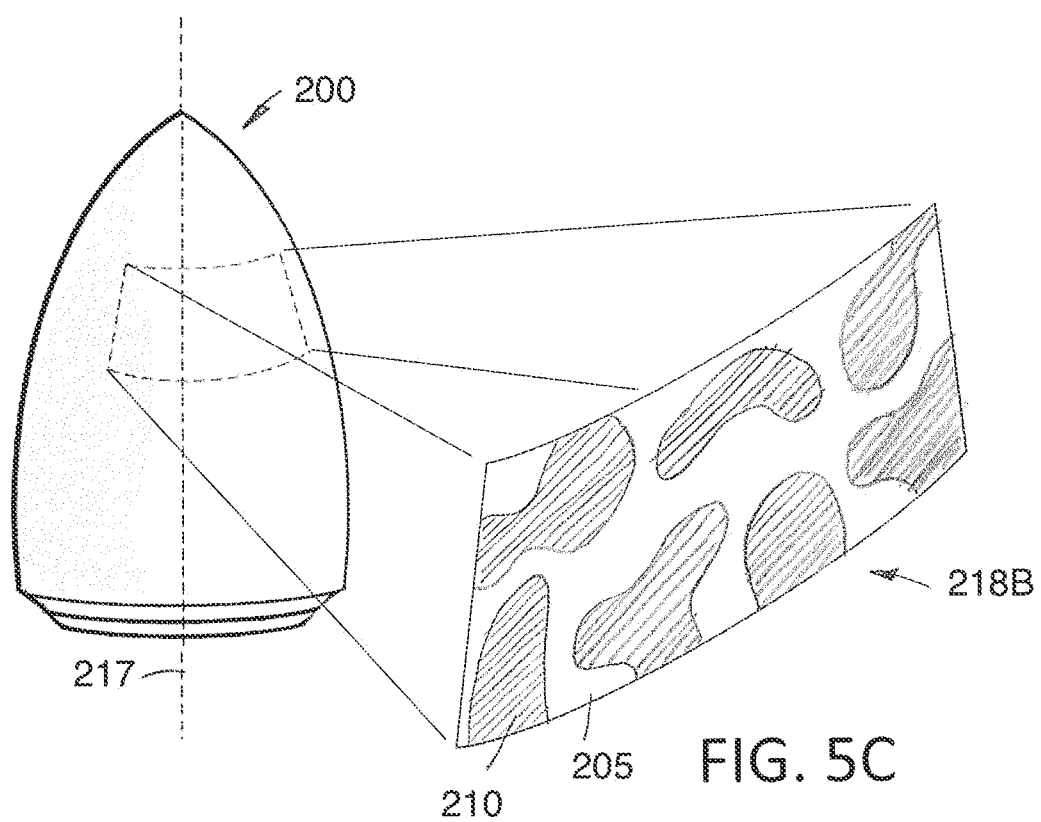
FIG. 5C is another variation blender of similar to that of FIGS. 5A-5B with a different pattern of features for cosmetic material pick up and tamping.

It should be appreciated that the surface of the blender 200 is in FIG. 5A can have different patterns of surface features 205 and 210, wherein FIGS. 5B-5C shows a linear pattern 218A and a free-form pattern 218B. It can be understood that the linear patterns can be annular, diagonal, or aligned with the axis 217 of the blender.

Figure 6B:
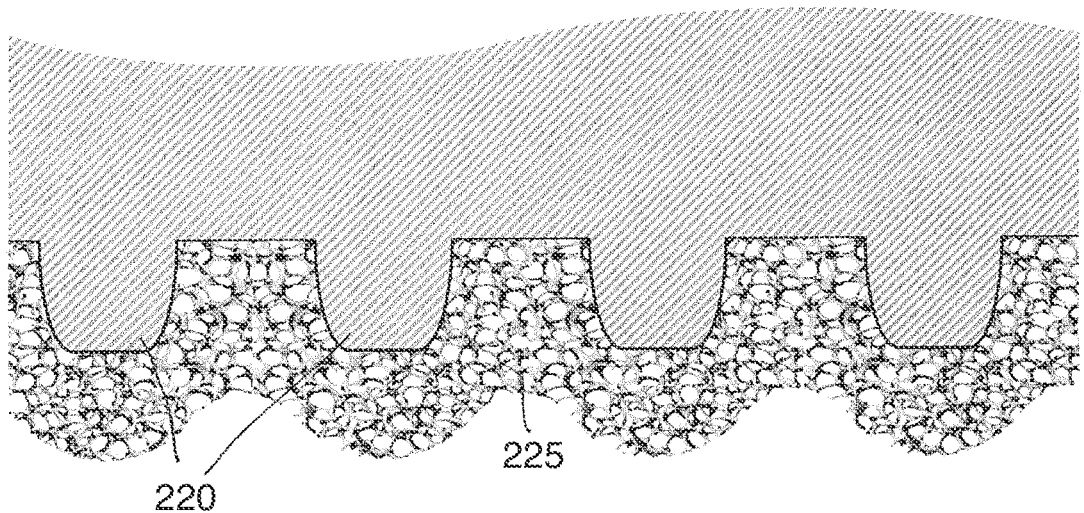
Figure 6C:
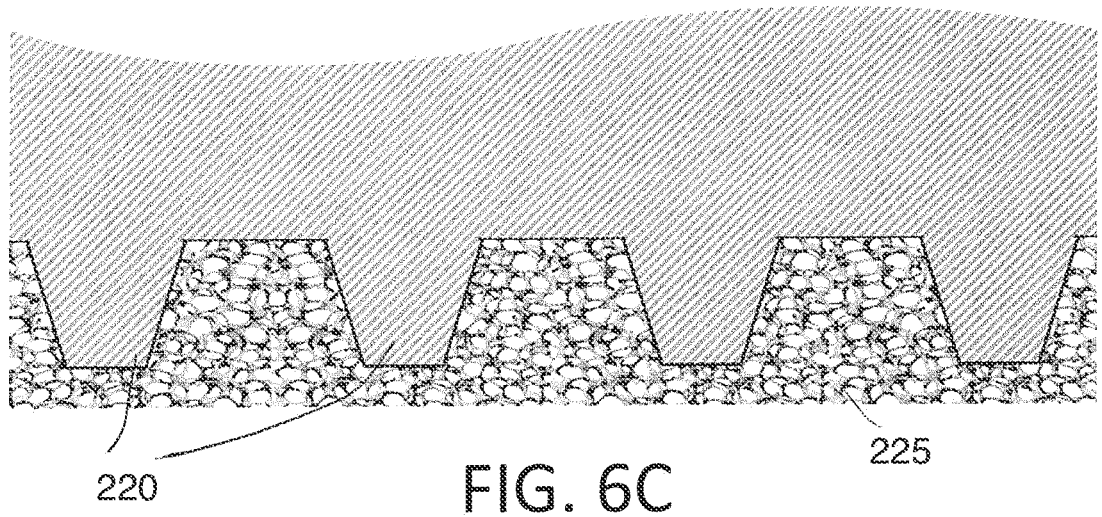
Figure 6D:
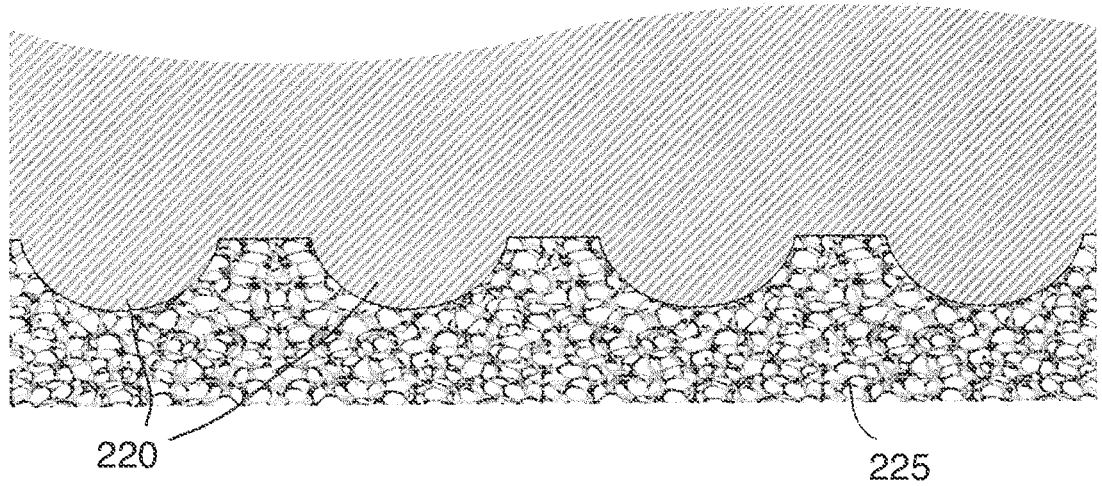
Figure 6E:
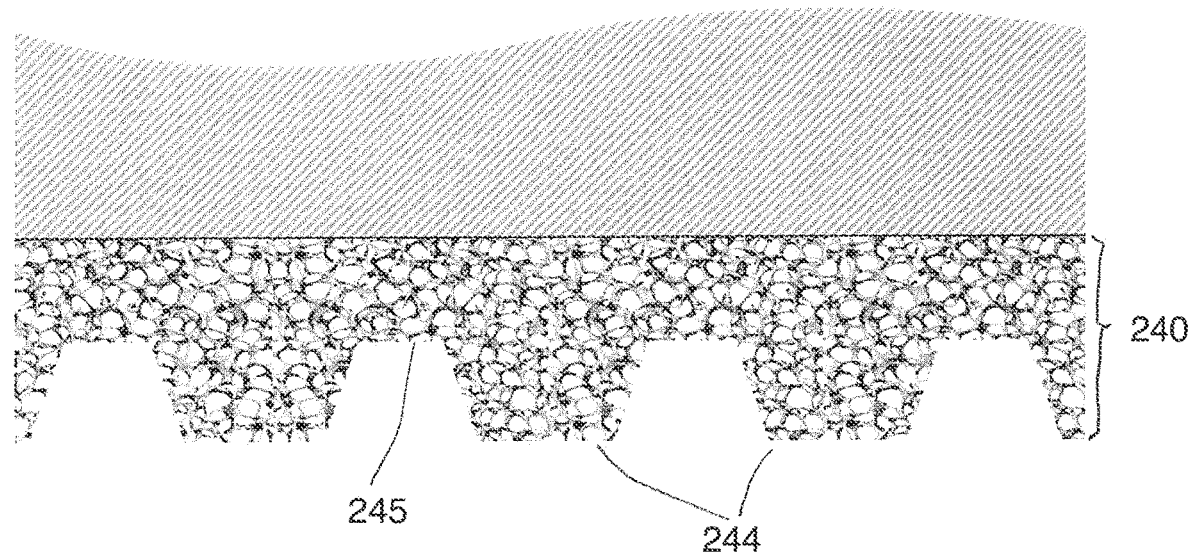

FIGS. 6B-6D show other variations of cross-sections where the tamping features 220 are embedded within the foam layer 225. The variation of FIG. 6B also shows that the outermost surface 228 of the foam layer 225 may be textured. FIG. 6E shows a variation in which the foam layer 240 is textured, which when compressed, will cause the protruding regions 244 to function more as a tamping feature than regions 245 intermediate the protruding regions 244 to have a similar effect as the different density materials shown in FIGS. 6A and 6C.

In general, a cosmetic applicator or blender corresponding to the invention comprises a resilient body shaped for gripping with the fingers of a user, wherein a surface portion of the body comprises first and second resilient portions in a pattern, and wherein the first resilient portion has first functional parameters and the second resilient portion has second functional parameters. The first and second functional parameters are selected from the group of material density, open cell characteristics, closed cell characteristics, material density, elastic modulus, hydrophobic characteristics, hydrophilic characteristics, oleophobic characteristics, oleophilic characteristics, elastic rebound characteristics, material thickness and color coding. The pattern of the features is selected from the group of adjacent lines, dots, squares, polygonal shapes and free-form shapes. The surface of the resilient body in a repose state can be smooth or non-smooth and textured. As described in variations of FIGS. 1-2B, the surface portion of the blender is removable from a core portion of the blender, which has a fluid impermeable surface.

A method corresponding to the invention related to blending cosmetic materials comprises providing a resilient body having a surface portion comprising first and second resilient portions in a pattern, wherein the first resilient portion is porous and is more easily compressible than the second resilient portion in less porous or nonporous, providing instructions to the user wherein the user repeatedly dabs the surface portion against cosmetics on a recipient's skin to blend such cosmetics, wherein such dabbing is adapted to cause the first resilient portion to pick up and redeposit cosmetic material and the second resilient portion tamps the redeposited cosmetic material into cosmetic layers and the recipient's skin.

FIGS. 7, 8A and 8B are schematic views of another blender 250 that provides for fluidic actuation for providing or adjusting the tamping features 255 in the blender surface 256. As can be seen in FIG. 7, an interior chamber 260 is compressible with the user's fingers to cause fluid flow through channels 265 to bubbles, or expandable tamping features 255 and 255' in FIGS. 8A and 8B to thus create or enhance the stiffness of such tamping features 255'. The elasticity of the materials causes a natural return flow of fluid media to the interior chamber 260. The fluid for actuating the tamping features can be either a liquid or simply air.

Figure 9:
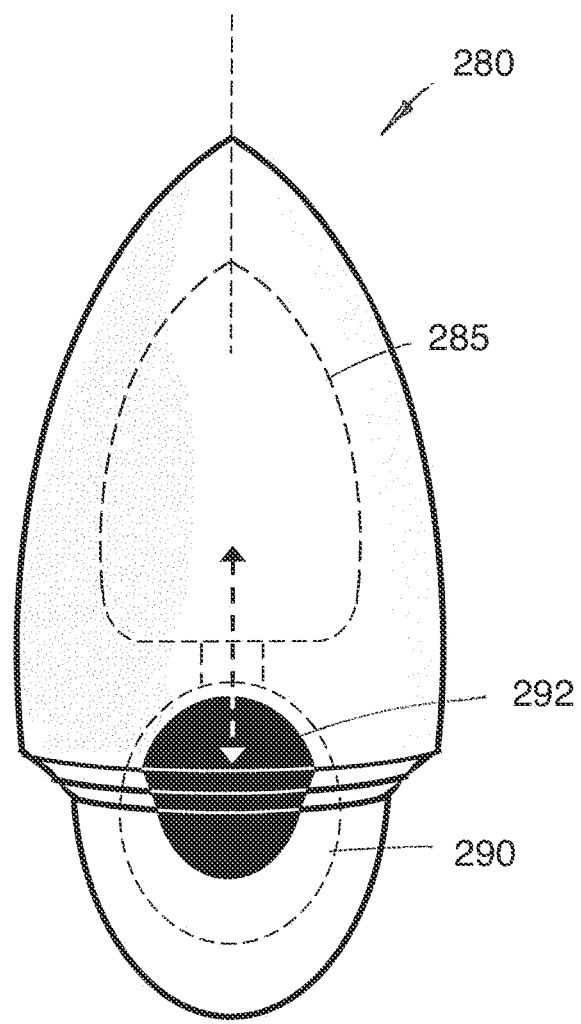
FIG. 9 is a view of another blender variation with an internal bladder with adjustable fluid pressure for altering the resilience or stiffness of the blender surface.

FIG. 9 is a view of another variation of a blender 280 with an internal bladder 285 with adjustable fluid pressure therein for altering the resilience or stiffness of the entire blender surface 288. In this variation, an interior chamber 290 is compressible with the user's fingers to provide a fluid flow into the bladder 285 to increase the stiffness or resistance to compression of the blender surface 288. As can be seen in FIG. 9, surface portions of the blender can have color markings 292 to indicate where the user's fingers can compress the interior chamber 290.

In general, a cosmetic applicator or blender comprises a body shaped for gripping with the fingers of a user, wherein a surface portion of the body has resilient characteristics, and wherein a bladder is carried in the interior of the body and an actuator is carried in the body for adjusting the fluid pressure in the bladder to alter the resilient characteristics of the surface portion. The actuator can be a manually compressible secondary bladder or interior chamber.

Figure 10:
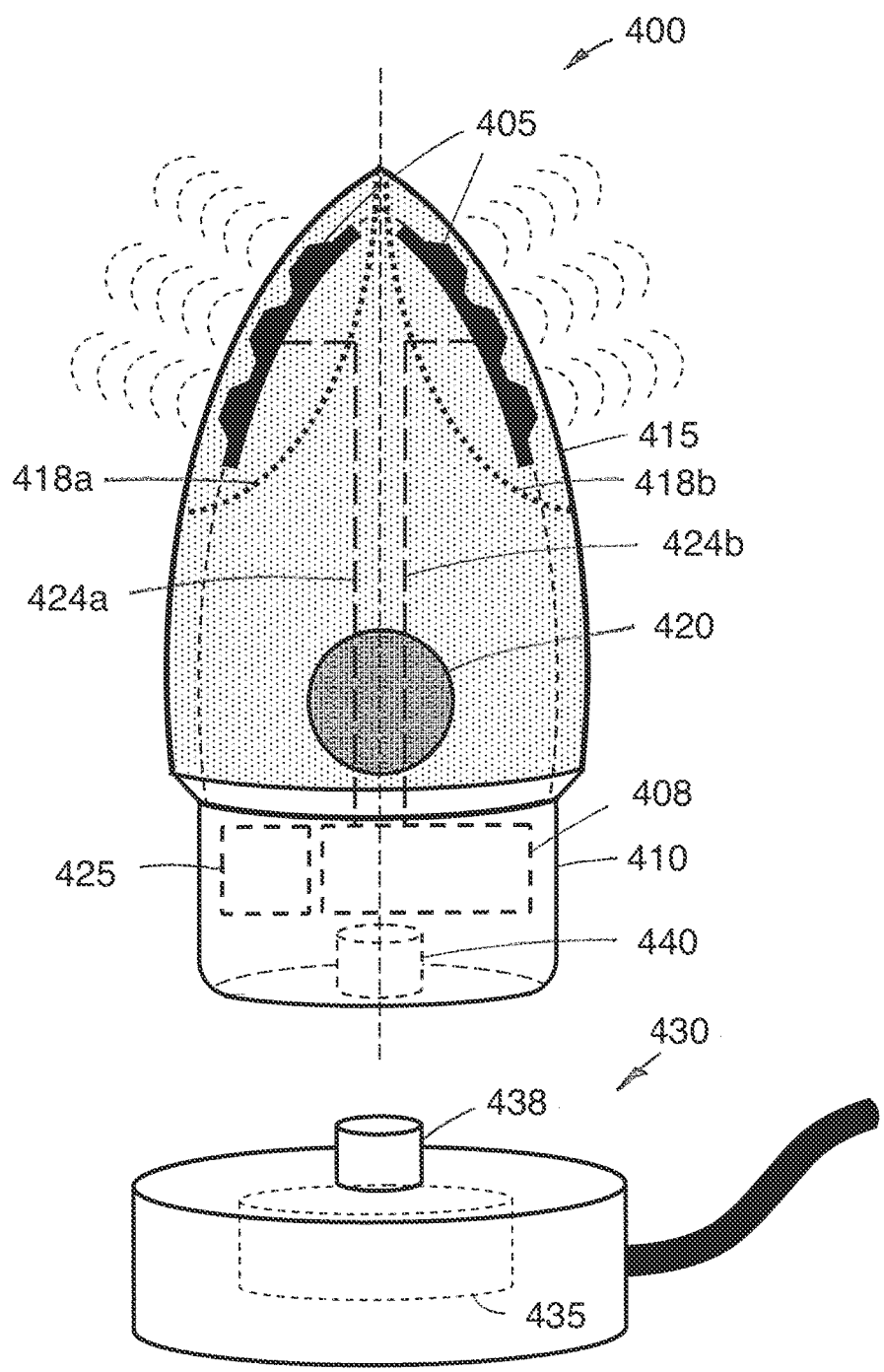
FIG. 10 is a schematic view of another blender variation which includes at least one ultrasonic actuator together with a battery and control unit carried by a core portion of the blender and a finger-actuated switch for operating the ultrasonic actuators and they stand for recharging the battery in the blender.

FIG. 10 illustrates another variation of a blender 400 which carries actuators 405 coupled to an energy source that can comprise a battery 408 within a core portion 410 of the blender. In this variation, the actuators are piezoelectric elements or ultrasound transducers that provide high-intensity ultrasonic waves for enhancing the tamping of cosmetic materials. The outer surfaces of such transducers may be in the surface 412 of the blender or slightly within an outer foam layer 415. Markings 418a and 418b are provided to indicate the location and directional orientation of such transducers. A push-button switch 420 is provided on the blender 400 to actuate the transducers. It can be seen that the electrical wires 424a and 424b couple the transducers 405 to the battery 408. The control unit 425 is provided to control the actuators 405 and may be adapted to operate in different modes, for example, with different frequencies or amplitudes. A base or stand 430 carries a recharging unit 435 that is provided for recharging the battery 408 is known in the art. The stand 430 can have a projecting element 438 that cooperates with receiving element 440 in the blender 400.

Figure 11:
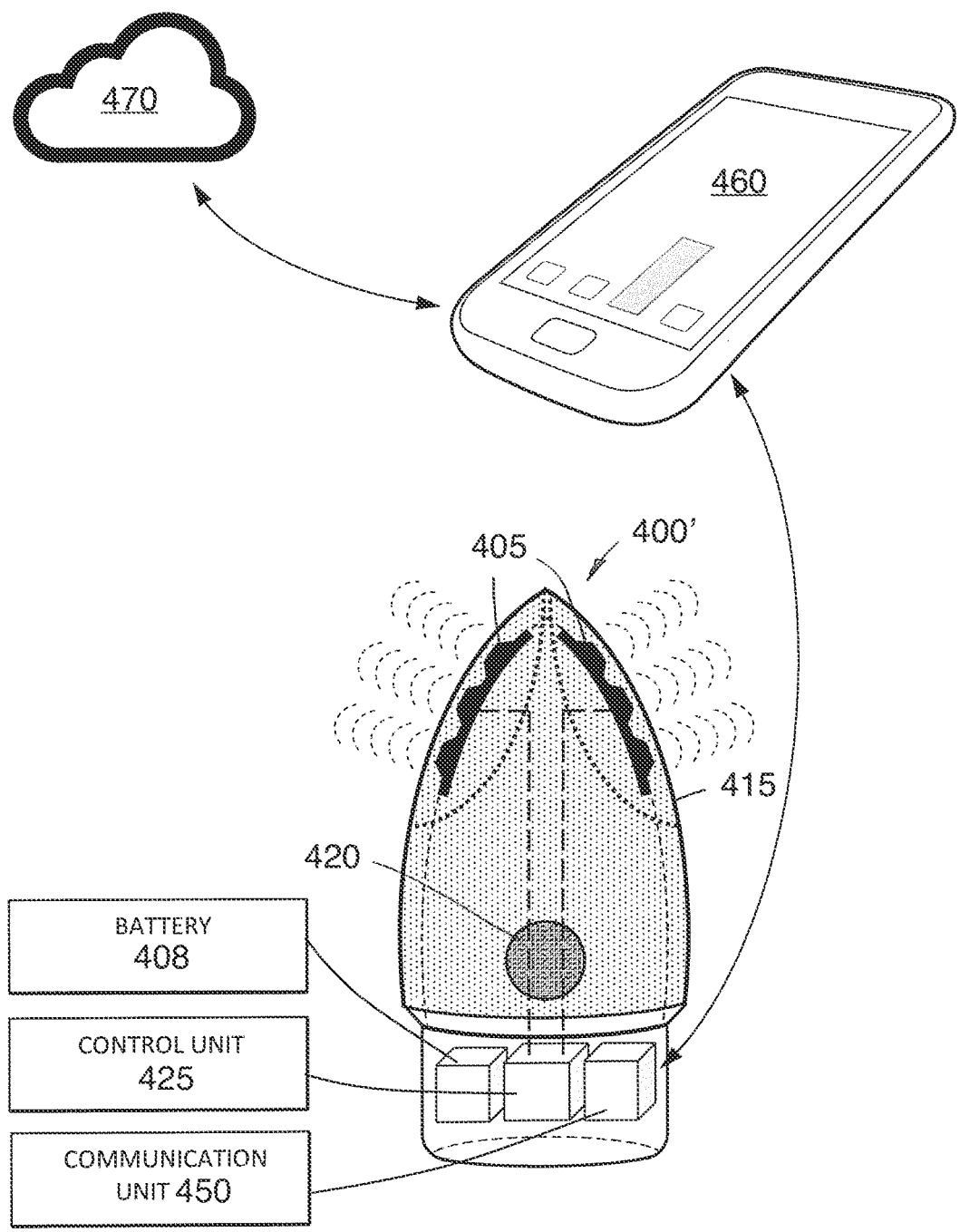
FIG. 11 is a schematic view of the blender of FIG. 10 that carries an additional communication unit for wirelessly communicating with a smart-phone and with the cloud.
Figure 12:
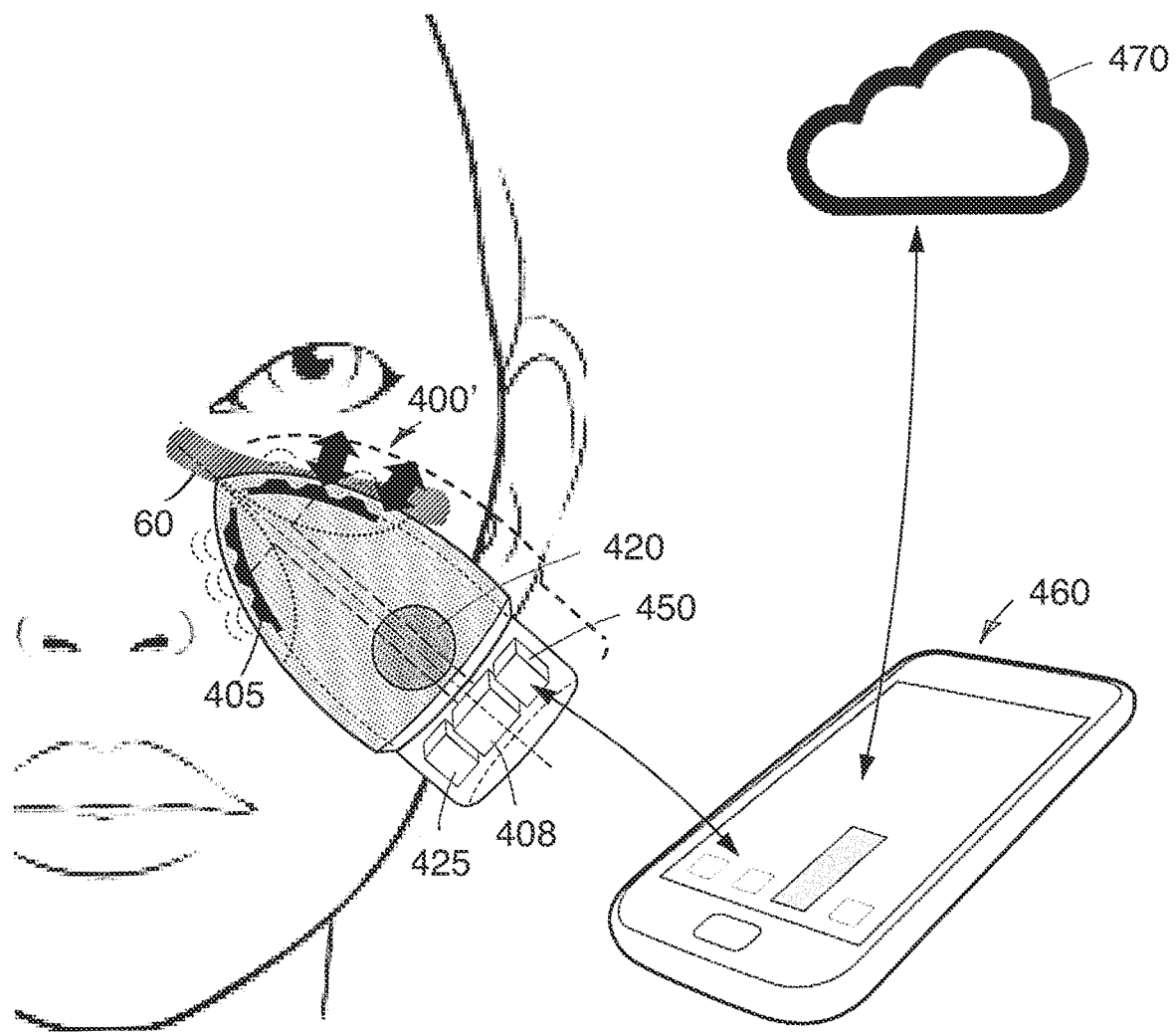
FIG. 12 illustrates a method of using the blender of FIG. 11 in blending cosmetic materials on a recipient's skin.

FIGS. 11 and 12 illustrate another variation of blender 400', which is similar to that of FIG. 10 except that the blender of FIG. 11 carries an additional communications unit 450 adapted for communicating with a remote device such as a smart phone 460, a tablet, and/or the cloud 470. FIG. 12 illustrates a method of using the blender 400' of FIG. 11 in blending the contouring makeup 60 wherein the ultrasound transducers 405 enhance the tamping of the cosmetic material as the blender is moved around the targeted skin surface.

In general, a cosmetic applicator corresponding to the invention comprises a body shaped for gripping with the fingers of a user, wherein the body has a surface portion comprising a resilient material and an electrically powered actuator in the body for actuating a surface portion of the body. The actuator is at least one of a fluidic actuator, a piezoelectric actuator, or an electromechanical actuator such as a linear resident actuator, eccentric rotating mass actuator, etc. The cosmetic applicator or blender can further carry a control unit for controlling operating parameters of the actuator or actuators. Further, the control unit can be configured to send and receive control signals wirelessly from a remote device, such a smart-phone, tablet computer. In some variations, the actuator is configured to apply forces generally outward from the surface portion of the body. In other variations, the actuator is configured to apply forces generally parallel to surface portion of the body.

Figure 13:
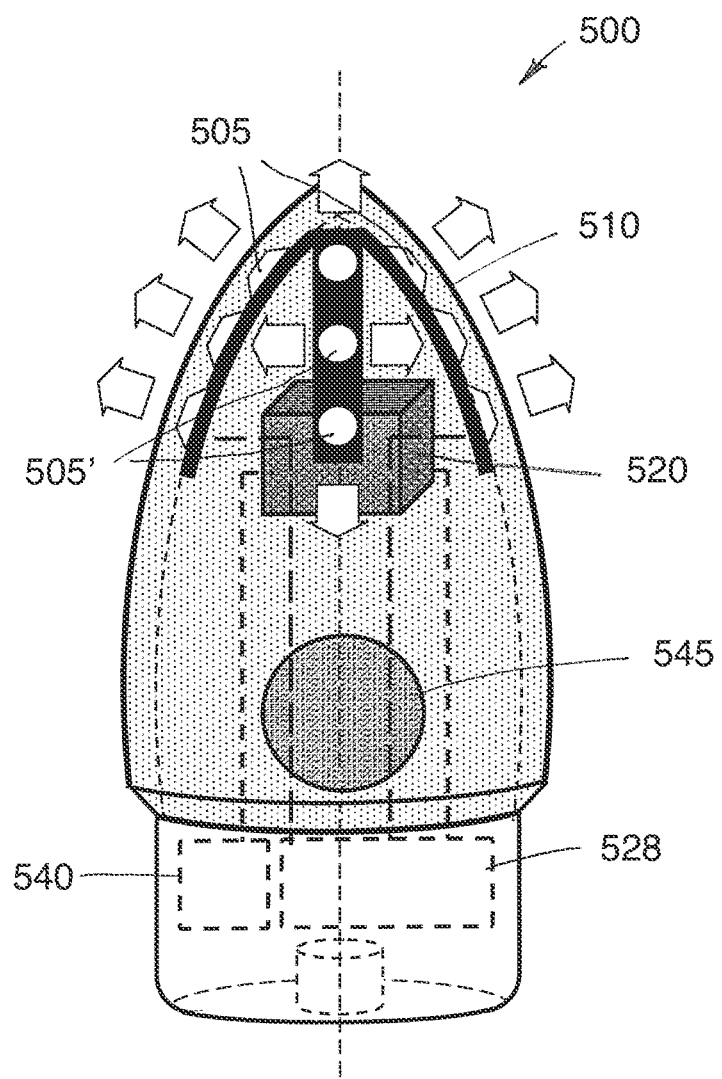
FIG. 13 is a schematic view of another blender variation similar to that of FIG. 11 showing a plurality of actuators adapted for force application in different directions together with accelerometer for sensing movements of the blender and communicating with the control unit carried by the blender.
Figure 14:
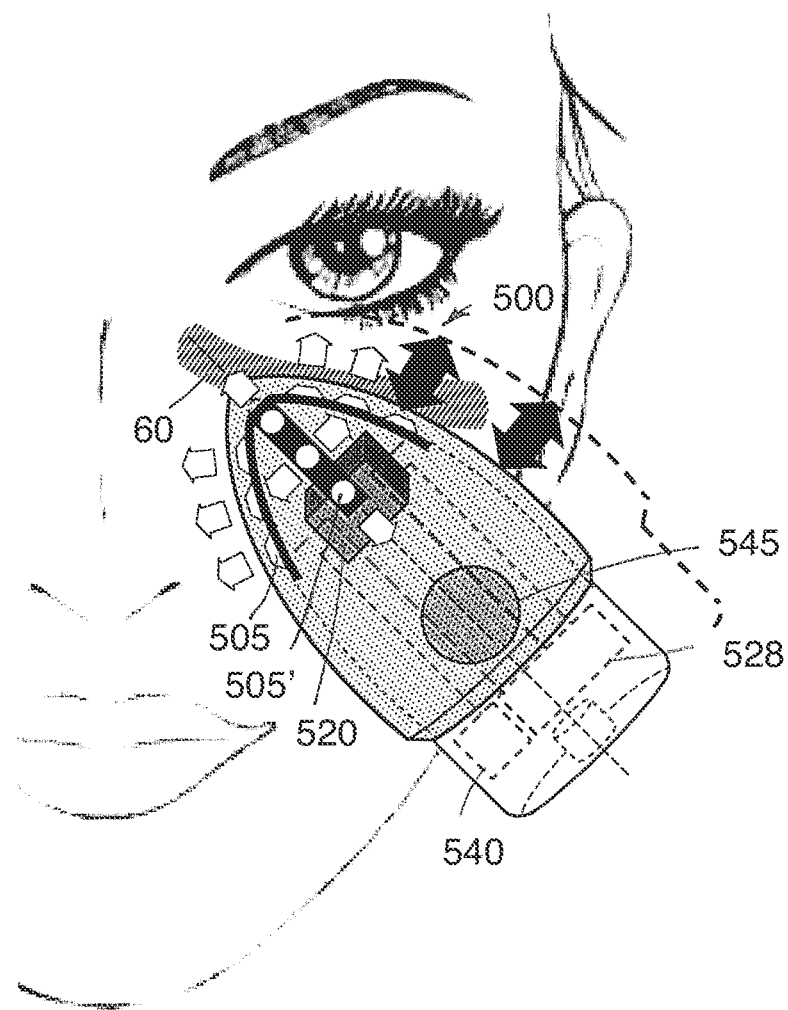
FIG. 14 illustrates a method of using the blender of FIG. 13 in blending cosmetic materials on a recipient's skin.

FIGS. 13 and 14 illustrate another variation of blender 500 which is similar to that of FIG. 11, except that the blender of FIGS. 13 and 14 carries transducers 505 that are adapted to apply tamping forces generally outward from the surface 510 of the blender and also carries transducers 505' are adapted to apply forces generally parallel to the blender surface 514 to thus stretch the recipient's skin and foundation. Thus, the combination of tamping forces and stretching forces are adapted to more effectively blend cosmetic material.

Of particular interest, the blender 500 of FIG. 13 carries an accelerometer 520, which allows for sensing the user's movement of the blender. The accelerometer 520 can sense the tamping stroke and the lifting stroke to thus turn on and off the actuators 505, 505' or selectively actuate the actuators 505, 505' only for a fraction of the tamping stroke when in contact with skin which would optimize use. As can be seen in FIG. 13, the accelerometer 520 is coupled to the battery 528 and the control unit 540, which can further control the on-off amplitude and frequency of the actuators. In one variation, the control system 540 can sense the parameters of the dabbing motion and can provide a tone or other indication to the user of the optimal dabbing rate or other useful operating suggestions. An actuator button 545 is shown for actuating the device. It should be appreciated that the blender 500 can carry a communications unit for communicating with remote device with a cloud as described previously.

FIG. 14 shows a method using the blender 500 of FIG. 13 to blend contouring makeup 60 into the patient's foundation and skin. In another aspect of the invention, it should be appreciated that the portion of the blender adapted for gripping with the user's fingers comprises a nonporous, wipe-clean surface to thus prevent the user's fingers from being covered with cosmetic material. The various embodiments above, the wipe-clean surface can extend around any actuator buttons in the blender. The shape of the disposable, porous surface component can then have a keyed shape for surrounding the projecting portions of the wipe-clean surface. In various embodiments, the disposable surface component can be keyed to cooperate with a keyed in the base component so that the disposable component is rotationally aligned with actuator elements in the base component.

In general, a cosmetic applicator or blender corresponding to the invention comprises a body shaped for gripping with the fingers of a user having a surface portion comprising a resilient material, and an accelerometer carried in the body for sensing movements of the body and providing signals of said movements. The blender further carries a control system configured to receive said signals from the accelerometer to thereby control an actuator carried by the blender body. The control system is further configured to receive signals from the accelerometer to thereby control an indicator mechanism carried by the blender to provide an aural signal, a visual signal and a tactile signal. The control system can be further configured to receive accelerometer signals and transmit such signals to a remote device.

Figure 15:
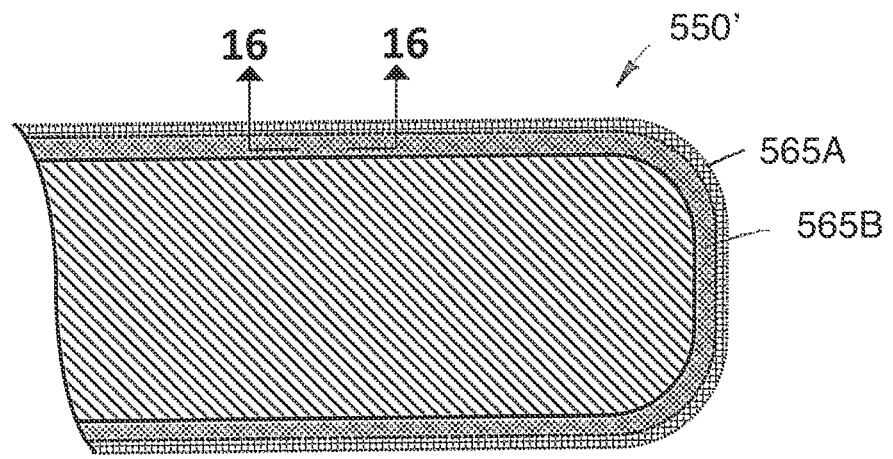
FIG. 15 illustrates a sectional view of another blender variation having a planar form with a surface comprising two surface layers having different porosity characteristics.
Figure 16:
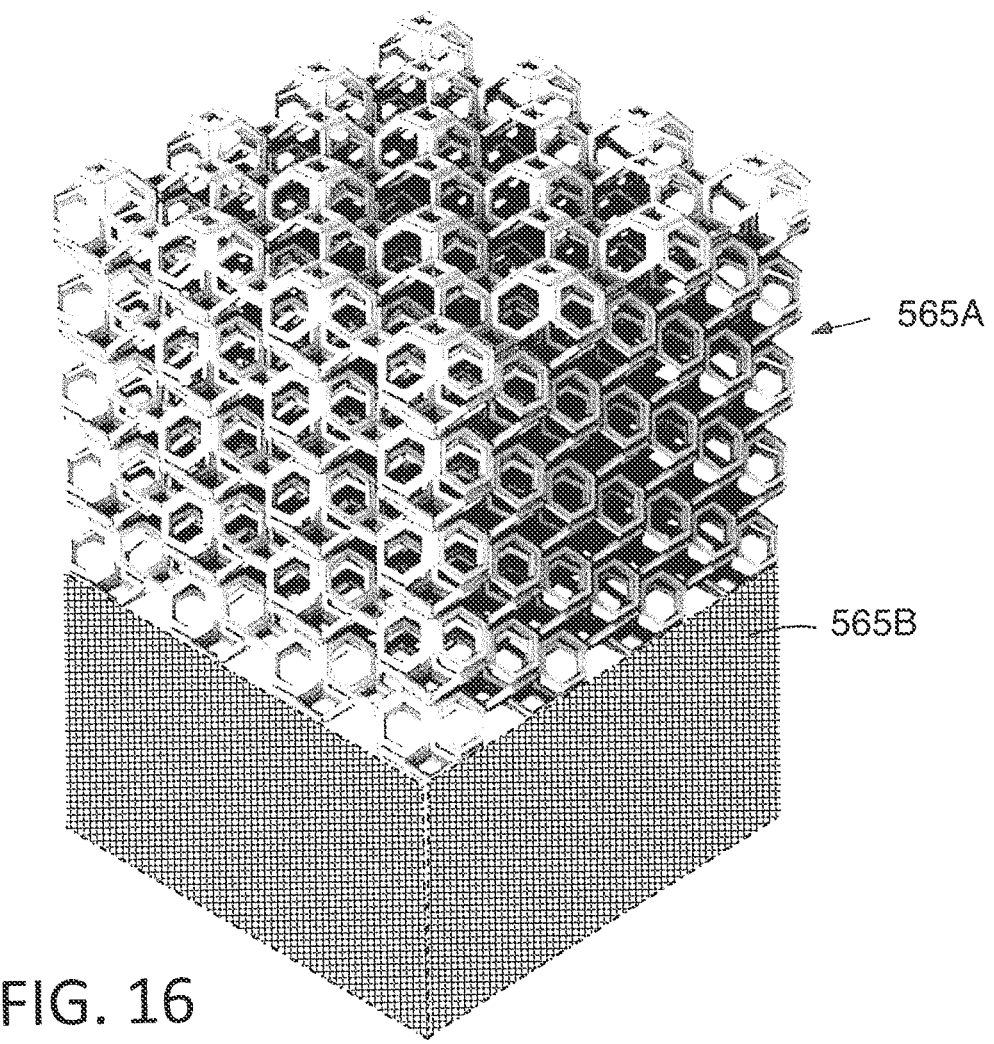
FIG. 16 is a great enlarged cutaway view of a portion of the first and second surface layers of FIG. 15 wherein the outermost layer comprises material fabricated by soft lithography or 3D printing to have uniform pore sizes adapted for controllably picking up cosmetic materials and wherein the second layer has different porosity characteristics which inhibit picking up cosmetic materials.

FIGS. 15 and 16 illustrate another blender 550 having a planar form with a surface component 560 comprising two surface layers, 565A and 565B having different porosity characteristics. FIG. 16 is a great enlarged cutaway view of the portion of the first and second surface layers 565A and 565B of FIG. 15 wherein in the outermost layer 565A comprises material formed by soft lithography or 3D printing to have uniform pore sizes adapted for controllably picking up cosmetic materials, whereas the second interior 565B layer has different porosity characteristics which inhibit picking up cosmetic materials. Thus, the blender surface will prevent excessive migration of cosmetic material into the surface to conserve such cosmetic materials. At the same time, the innermost layer 565B is adapted to readily absorb water to carry the desired moisture content which facilitates the blending of cosmetic materials.

It should be appreciated that other blenders can carry sensors capable of sensing contact with the skin, which can be coupled to a control unit 540 as described above to control actuators or indicators described above. Such sensors can consist of pressure sensors, impedance sensors, capacitance sensors, and the like. Further, a blender corresponding to the invention can carry LEDs coupled to the control unit 540 as in FIG. 11 for warming the cosmetic materials, cross-linking materials, or providing a signal to the user, for example, either with pulsed lighting or continuous lighting of the LEDs to indicate a suggested dabbing frequency or another recommended functional aspect of using the blender. In other variations, such LEDs can be provided in different colors or other aspects simply as a novelty feature.

In another variation (not shown), the blender can have a pore that carries a compact motor and pump that is adapted to provide fluid pulses through the porous surfaces of the blender of the type shown above to assist in the blending of the cosmetic materials. Inexpensive and disposable pumps are readily available and are adapted for use in the blender core portion that couples to separate foam surface portions.

Although particular embodiments of the present invention have been described above in detail, it will be understood that this description is merely for purposes of illustration and the above description of the invention is not exhaustive. Specific features of the invention are shown in some drawings and not in others, and this is for convenience only and any feature may be combined with another in accordance with the invention.

Although particular embodiments of the present invention have been described above in detail, it will be understood that this description is merely for purposes of illustration and the above description of the invention is not exhaustive. Specific features of the invention are shown in some drawings and not in others, and this is for convenience only and any feature may be combined with another in accordance with the invention. A number of variations and alternatives will be apparent to one having ordinary skills in the art. Such alternatives and variations are intended to be included within the scope of the claims. Particular features that are presented in dependent claims can be combined and fall within the scope of the invention. The invention also encompasses embodiments as if dependent claims were alternatively written in a multiple dependent claim format with reference to other independent claims Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A cosmetic applicator comprising:
    a resilient body having a rounded shape extending 360° around a longitudinal axis and being tapered in a distal direction toward an apex, where the body is shaped for gripping with fingers of a user to allow any portion of the rounded shape to pick up makeup and tamp makeup; and
    wherein an outer layer of the body has a thickness of between 0.2 mm and 5 mm around the entire rounded shape and a fluid impermeable layer between the outer layer and a core of the body, wherein the outer layer comprises a monolithic first resilient portion and a monolithic second resilient portion that forms a pattern in the first resilient portion around the rounded shape of the body, wherein the first resilient portion has a first mean pore size parameter adapted for picking up makeup and the second resilient portion has a second mean pore size parameter adapted for tamping of makeup, wherein the second mean pore size is less than the first mean pore size; and
    wherein the first resilient portion comprises an open cell foam having a mean pore diameter between 100 microns and 500 microns, and wherein a volume of said open cell foam is less than 10% of a total volume of the applicator.

2. The cosmetic applicator of claim 1, wherein the pattern is selected from a group of adjacent lines, dots, squares, polygonal shapes and free-form shapes.

3. The cosmetic applicator of claim 1, wherein the outer layer of the resilient body in a repose state is smooth.

4. The cosmetic applicator of claim 1, wherein the outer layer of the resilient body in a repose state is textured.

5. The cosmetic applicator of claim 1, wherein an outer surface of the first resilient portion is raised above an outer surface of the second resilient portion.

6. The cosmetic applicator of claim 1, wherein the second resilient portion has no porosity.

7. The cosmetic applicator of claim 1, wherein the second resilient portion has less porosity than the first resilient portion.

8. A cosmetic applicator comprising:
    a resilient body having a rounded surface extending 360° around a longitudinal axis and being tapered in a distal direction toward an apex, where the resilient body is shaped for gripping with fingers of a user to allow any portion of the rounded surface to pick up makeup and tamp makeup;
    an outer layer of the resilient body comprising a monolithic first elastomeric portion and a monolithic second elastomeric portion arranged in a pattern within the first elastomeric portion around the rounded surface, wherein the first elastomeric portion has an outer surface that is raised above an outer surface of the second elastomeric portion; and
    wherein the resilient body comprises an open cell foam having a mean pore diameter between 100 microns and 500 microns, wherein a volume of the open cell foam is less than 10% of a total volume of the applicator.

9. The cosmetic applicator of claim 8, wherein the pattern is selected from the group of adjacent lines, dots, squares, polygonal shapes and free-form shapes.

10. The cosmetic applicator of claim 8, wherein the outer layer has a thickness of less than 5 mm.

11. The cosmetic applicator of claim 8, further comprising a fluid impermeable layer underlying the outer layer.

* * * * *